No. 628,981. Patented July 18, 1899.
G. GRIFFIN.
AUTOMATIC BUTTON LATHE.
(Application filed Feb. 23, 1899.)
(No Model.) 6 Sheets—Sheet 1.
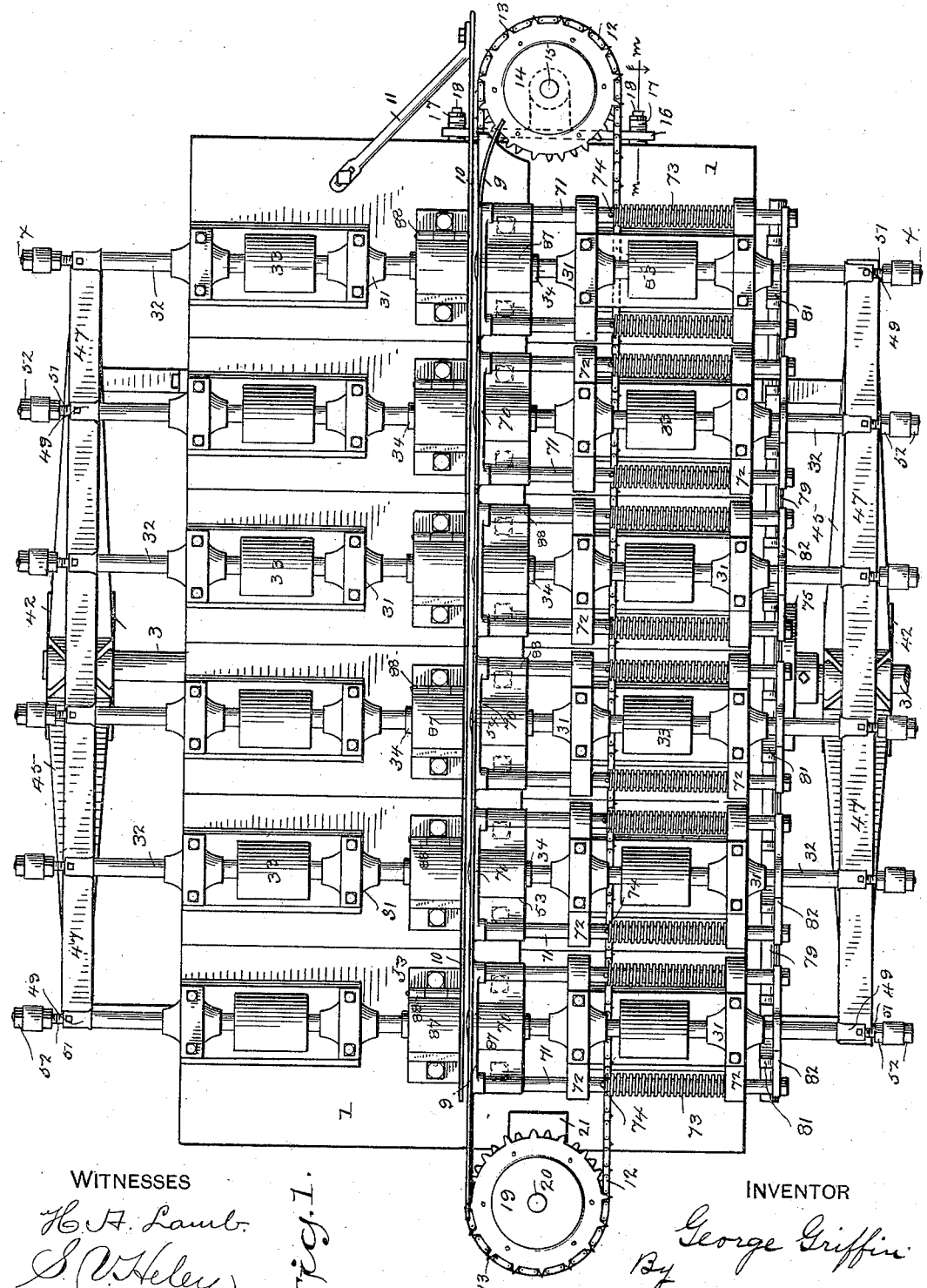
WITNESSES
H. A. Lamb
S. V. Heley
INVENTOR
George Griffin
By A. M. Wooster
Atty.
THE NORRIS PETERS CO., PHOTO-LITHO., WASHINGTON, D. C.

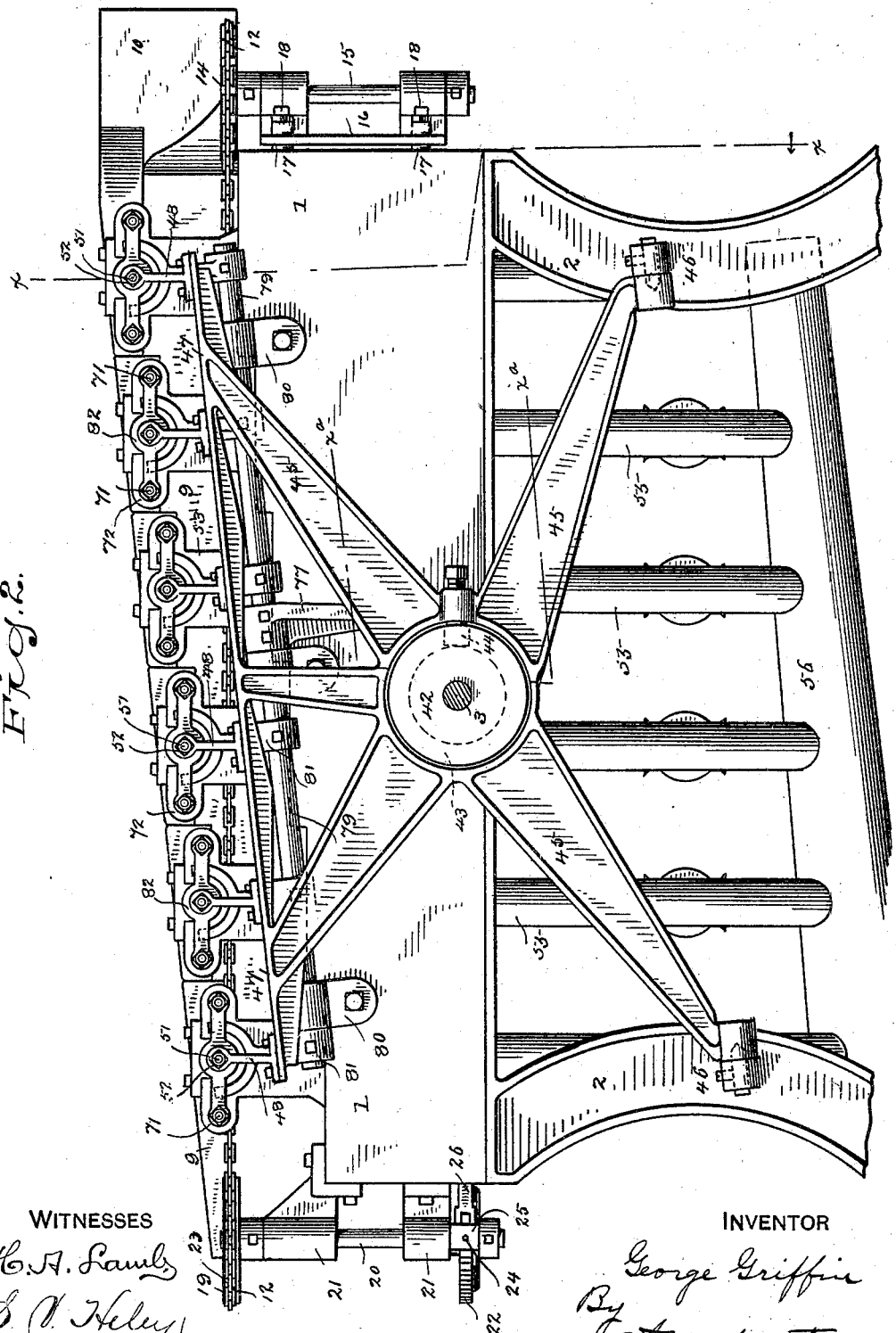

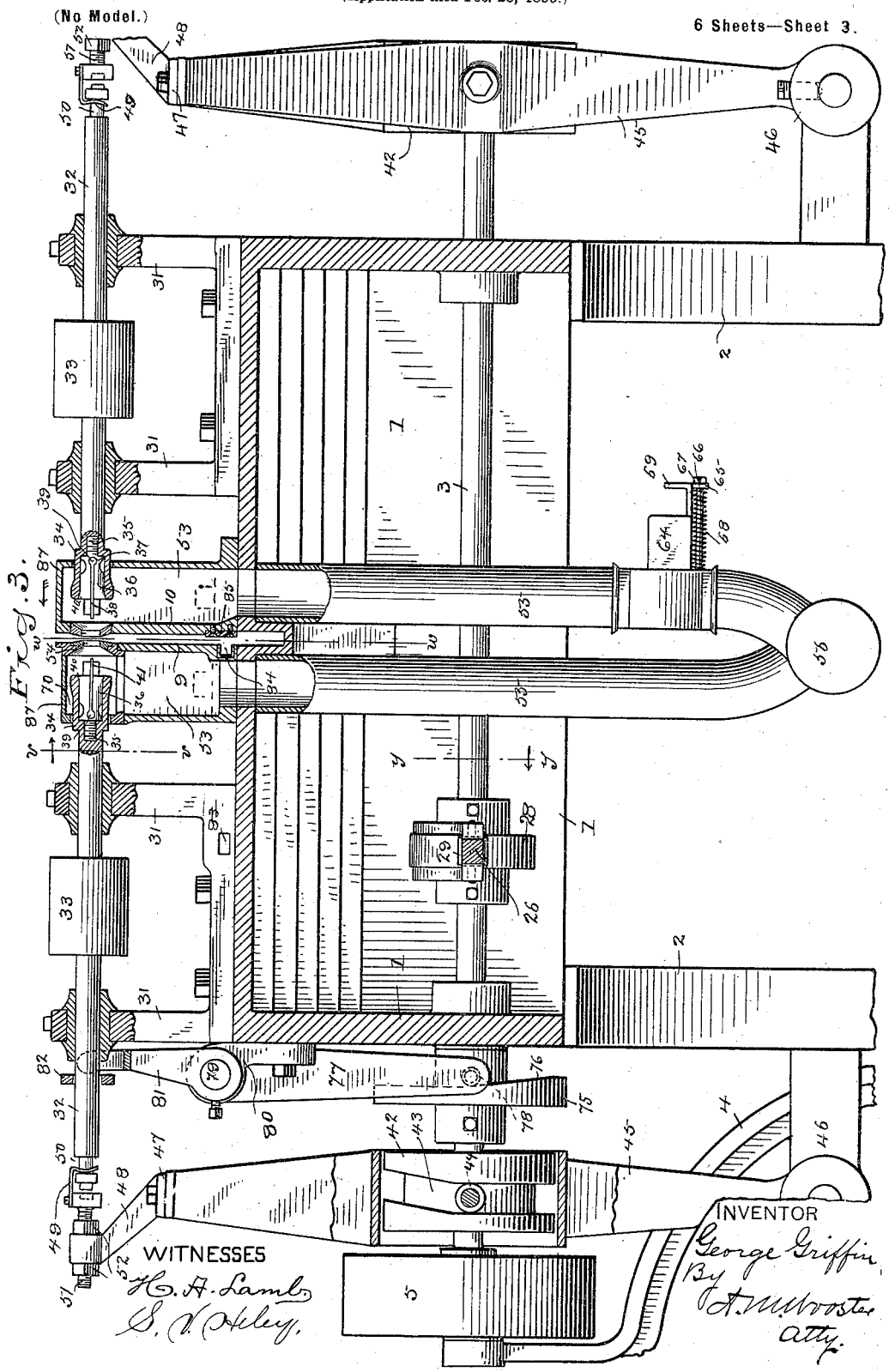

No. 628,981. Patented July 18, 1899.
G. GRIFFIN.
AUTOMATIC BUTTON LATHE.
(Application filed Feb. 23, 1899.)
(No Model.) 6 Sheets—Sheet 4.
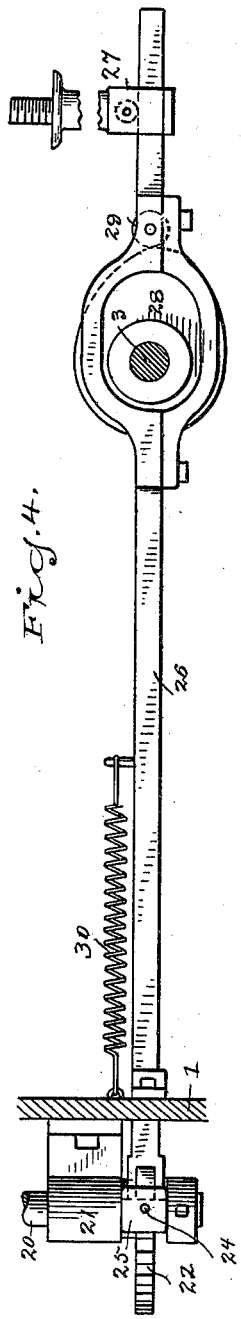
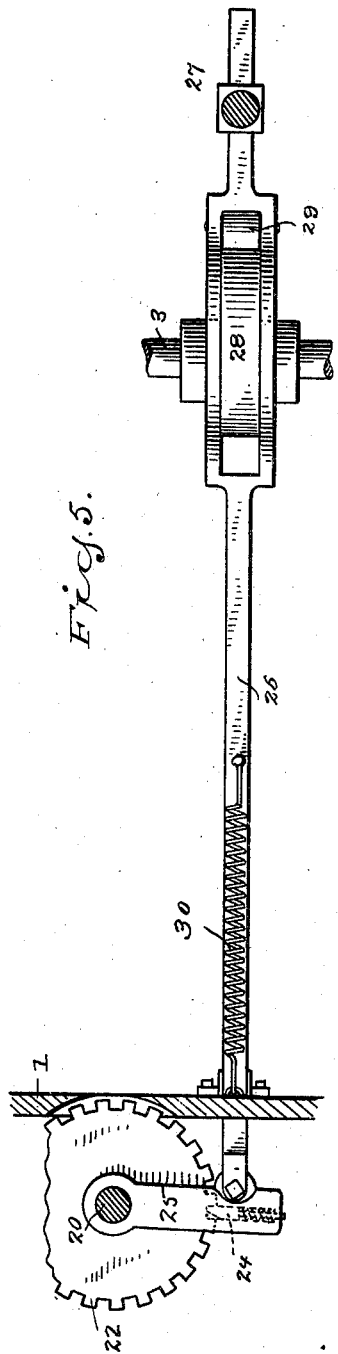
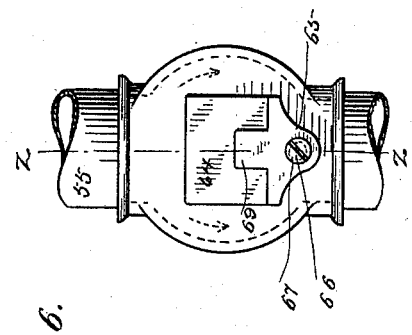
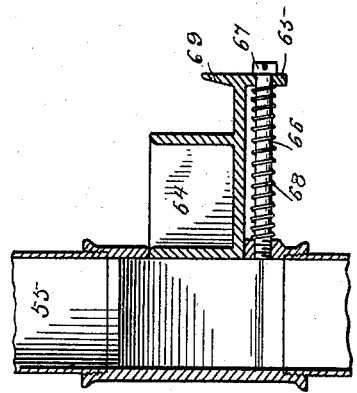
WITNESSES
H. A. Lamb
S. V. Heley
INVENTOR
George Griffin
By
A. M. Wooster
Atty.
THE NORRIS PETERS CO., PHOTO-LITHO., WASHINGTON, D. C.

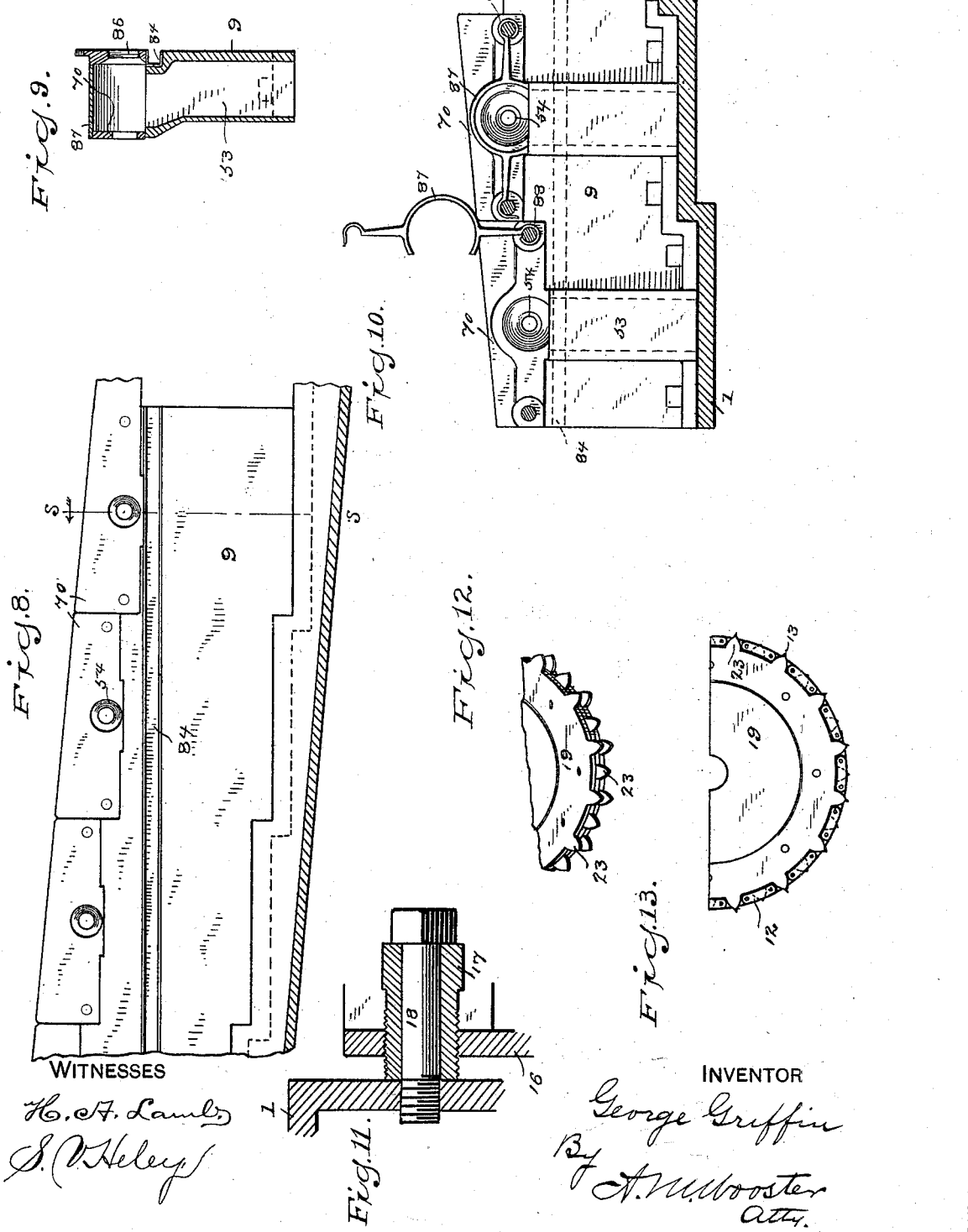

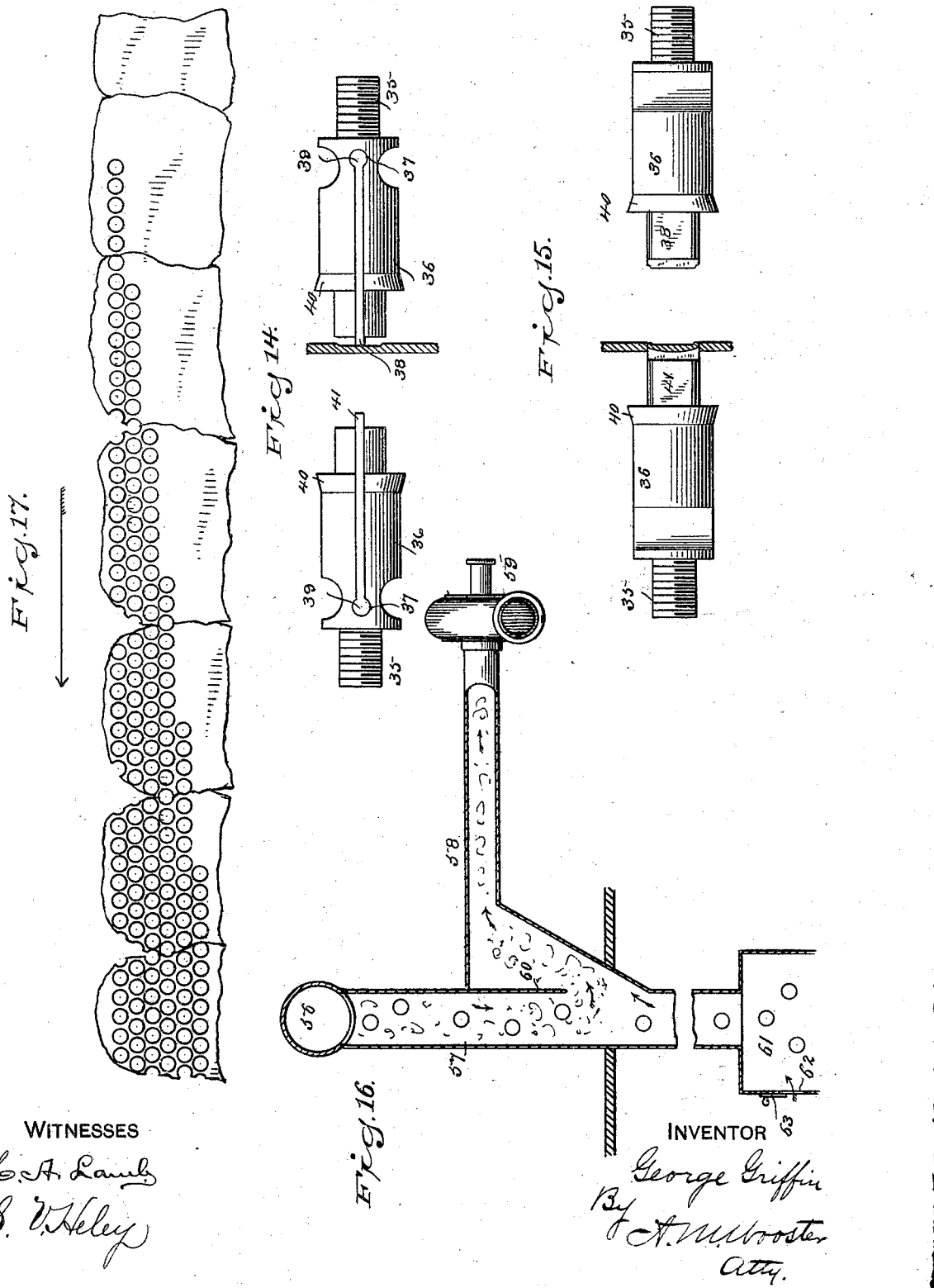

UNITED STATES PATENT OFFICE.

GEORGE GRIFFIN, OF BOTSFORD, CONNECTICUT.

AUTOMATIC BUTTON-LATHE.

SPECIFICATION forming part of Letters Patent No. 628,981, dated July 18, 1899.

Application filed February 23, 1899. Serial No. 706,585. (No model.)

*To all whom it may concern:*

Be it known that I, GEORGE GRIFFIN, a citizen of the United States, residing at Botsford, county of Fairfield, State of Connecticut, have invented a new and useful Automatic Button-Lathe, of which the following is a specification.

My invention has for its object to produce a machine for cutting and turning horn and similar buttons from the pieces of stock which shall be comparatively simple and inexpensive to produce, durable, easy to manage, and not likely to get out of repair, which will cut the stock to the least possible waste, and which will produce the finest quality of buttons at a rate of speed greatly in excess of any machines heretofore produced. With these ends in view I have devised the simple and novel automatic lathe which I will now describe, referring by numbers to the accompanying drawings, forming part of this specification, in which—

Figure 1 is a plan view of the machine except that the belt-pulley on the main shaft is removed; Fig. 2, a side elevation corresponding with Fig. 1, the main shaft being in section and the belt-pulley removed; Fig. 3, a section, on an enlarged scale, on the line $x\ x$ in Figs. 1 and 2, a portion of one of the levers being in section on the line $x^a\ x^a$ in Fig. 2; Fig. 4, a detail sectional view on the line $y\ y$ in Fig. 3, illustrating in elevation the chain feeding mechanism; Fig. 5, a plan view corresponding with Fig. 4; Fig. 6, a detail view, on an enlarged scale, of the button-catching device which is placed in the button-delivery tube and which may be used to take out specimen buttons at any time in order that the operator may ascertain at any time just what quality of work the machine is doing without stopping the machine; Fig. 7, a detail sectional view on the line $z\ z$ in Fig. 6; Fig. 8, an enlarged sectional view on the line $w\ w$ in Fig. 3 looking toward the left, showing a portion of the bed, one of the supporting-castings, and reciprocating jaw-carriers and jaws; Fig. 9, a sectional view on the line $s\ s$ in Fig. 8; Fig. 10, an enlarged sectional view on the line $v\ v$ in Fig. 3 looking toward the right, showing a portion of the bed, one of the supporting-castings, and reciprocating jaw-carriers and jaws, the spindles and heads being removed; Fig. 11, an enlarged detail view on the line $m\ m$ in Fig. 1, illustrating the operation of the chain-tightening device; Figs. 12 and 13, detail views illustrating the construction of the chain-carrying wheels; Figs. 14 and 15, enlarged detail views illustrating the operation of the cutters, the cutters appearing in edge view in Fig. 14 and in plan view in Fig. 15, the first cutter being in operative position in Fig. 14, the second cutter not having commenced to move forward, and the second cutter being in operative position in Fig. 15, the first cutter having moved backward out of operative position; Fig. 16, a detail sectional view illustrating the operation of the separator which removed the shavings, leaving the buttons to drop down into a suitable receptacle; and Fig. 17 is a detail view showing the manner in which the pieces of stock are fed into the machine, the way in which the buttons are cut therefrom, and the condition of the scrap as it passes from the machine.

1 denotes the bed of the machine, which may be inclined one end toward the other or may be a series of steps extending from one end of the machine to the other, as shown in the drawings, the object of this construction being to enable the builder to place each succeeding set of mandrels, cutters, and jaws extending from right to left, as seen in Figs. 1 and 2, lower than the one before it, as and for the purpose as will presently be fully explained. The bed rests upon suitable legs 2, which may be of any ordinary or preferred design.

3 denotes the main shaft, which is shown as journaled transversely to the bed and extends on opposite sides thereof, one end of the shaft being supported by a bracket 4. (See Fig. 3.) This shaft is driven by a belt (not shown) passing over a belt-pulley 5.

The passage-way through the machine for the slabs or sheets of hoof, horn, or other material which is to be made into buttons is formed between two plates 9 10, suitably supported on the bed 1, which plates form the front walls of the boxes within which the cutters operate. (See Fig. 3.) At the entrance end the plate 10 is supported, by means of a suitable brace 11, against the pressure of the feeding-chain 12, which is provided with teeth or spikes 13 to engage the sheets of material and feed them through the machine. The said chain 12 is carried by two sprocket-wheels 14 and 19, the former being an idle-wheel mounted on a vertical shaft 15, having its bearings supported by a plate 16, the latter being adjustable toward and from the frame of the machine (see Figs. 2 and 11) by means of hollow screws 17, passing through the plate 16 and bearing against the side of the frame, the supporting and attaching bolts 18 being passed through the hollow screws into the frame. By turning the screws 17 on the bolts 18 the plate 16 and the shaft 15 and its idler-sprocket may be forced away from the frame to tighten the chain. The sprocket 19 is secured to a shaft 20, supported in fixed bearings 21 at the other end of the bed, the lower end of said shaft having a ratchet-wheel 22 secured thereto, by means of which ratchet the sprocket 19, and consequently the chain 12, imparts a step-by-step feed to the material, as will presently be explained.

The sprockets or chain-carrying wheels 14 and 19 are composed of a plurality of disks (preferably three, see Figs. 2, 12, and 13) cut or stamped from sheet metal and having integral teeth 23, the said disks being riveted together with their teeth alternating, as indicated, so that the chain-links which lie flat against the sprocket will have their spaces entered and engaged by the teeth of the middle disk and their ends engaged by the teeth of the outer disks. This construction prevents any possibility of the chain moving while the cutters are at work.

The step-by-step feed movement of the chain is imparted by a pawl 24, (see dotted lines in Fig. 5,) carried by an arm 25, mounted to oscillate on the shaft 20, the said pawl having a spring to insure its proper engagement with the ratchet-wheel 22. A suitable detent-pawl (not shown) is employed to prevent back motion of the ratchet and the shaft 20 and chain 12. The pawl-arm 25 has pivoted to it one end of a reciprocating rod 26, having bearings in the frame of the machine and in a suitable bracket 27, depending from the bed of the machine, said rod being slotted, as shown in Figs. 4 and 5, to receive the main shaft 3 and a cam 28, carried by said shaft, the rod 26 having a roller 29 normally held in contact with the periphery of the cam by means of a spring 30, attached to the rod and to the frame. By means of this construction of chain-feed, as described, the feed is a positive one, and the stock can move in no direction during the cutting operation owing to its being firmly held by the spurs 13 of the chain, it being understood, of course, that the timing of the operation of the parts is such that the cam acts on the roller 29 only when the cutters and the jaws or clamps hereinafter described are temporarily withdrawn from the stock.

On the inclined bed 1 or the several steps thereof are arranged the bearings for the cutter-mandrels and the jaw or clamp rods, there being six pairs of these devices in the machine illustrated. The devices in each pair are duplicates of those in the others, and it is to be understood that the number of pairs of such devices may vary according to the width of the stock employed relatively to the size of buttons to be made. In other words, if a machine is to be used for making quite small buttons from stock of the same size or width as that indicated in the drawings there may be a greater number of pairs of smaller cutters employed, the series being arranged in a line having a more acute angle to the line of feed, all as will be more apparent hereinafter. Each pair or set of devices may be described as follows:

In Fig. 3 are shown, partly in section, the bearings for the pair or set of devices for turning and cutting out the first button from the piece of material as it begins its traverse through the machine. It is to be understood that the bearings of the other sets are the same and are placed successively lower, so that as the pieces are fed in by the attendant close together (see Fig. 17) and are advanced by the chain-feed described all of the buttons cut along the upper line are formed by the first set of devices and the buttons cut along the successive lower lines are formed by the sets of devices which are placed on the successive lower levels of the bed, and the said arrangement of the several sets is such relatively to the feed that each operation in a lower line takes place on the material below the space between two operations in the line above it, so as to form the holes with the least waste of material, as shown in Fig. 17. The bearings referred to are indicated at 31, and said bearings at the right in Fig. 3 support the spindle or mandrel 32 of the cutter which operates first of the pair. Said spindle has a pulley 33 secured thereto and is adapted to be driven at a sufficiently rapid speed by a belt. (Not shown.) The inner end of the spindle has a cup-shaped socket 34, and at the bottom thereof is a threaded recess to receive the threaded end 35 of the cutter-head 36. Said head is split nearly its length, and at the inner end of the split is an enlarged nearly cylindrical recess 37, extending diametrically through the head. In said split is located the cutter 38, having a rib 39 at its inner end fitting the recess 37 when the cutter is slipped edgewise into the split and recess. The outer end of the split head is slightly enlarged or tapered outwardly, as at 40, and the cup-shaped end of the spindle is internally flared, as indicated, so that when the cutter has been fitted in the head as described and the latter is screwed into the end of the spindle the two sides of the head are clamped upon the cutter, and the latter is thus rigidly connected with the spindle, but may still be easily removed for any purpose.

The end of the cutter 38 is preferably formed to produce the face of the button by its rotative action against the surface of the material, and after it has performed its work it recedes from the material by mechanism presently described, and as it does so the other cutter 41 of the pair advances and first forms the back of the button and then cuts it out of the sheet of material and then pushes it slightly toward the receding first cutter and permits it to drop, thus insuring uniformity in the discharge of completed buttons. The second cutter 41 of the pair is similar in its construction (except as to the shape of its cutting end) to the cutter 38 and is mounted and operated similarly thereto. Hence the same reference-numerals are used in the drawings for the mountings of the cutters at the left of Figs. 3, 14, and 15 as at the right of said figures.

To alternately project and retract the cutters on the opposite sides of the stock, hubs 42 are secured to the projecting ends of the main shaft 3, and each of said hubs is provided with a cam-groove 43 to receive the roll 44, carried by a lever 45, which, as shown in Fig. 2, is somewhat star-shaped and is pivoted to the frame at 46 and at the ends of its upper branches carries a connecting bar or plate 47, on which is mounted a series of brackets 48, equal in number to the number of spindles on that side of the machine. Each bracket 48 (see Figs. 1 and 3) is provided with an adjustable finger 49, which engages a reduced portion or groove 50 in the rear end of the spindle 32, said groove being of sufficient width to give the finger some little play before it shifts the spindle out, so as to cause the cutter to abruptly leave the material and avoid any tendency to stick thereto. Said finger is preferably of spring metal and is attached to the head of a bolt 51, which passes through the upper end of the bracket 48 and is adjustably secured by set-nuts 52. The face of the head of the bolt 51 is adapted to bear against the end of the spindle to positively advance the cutter.

The timing of the operation of the two cam-grooved hubs 42 on the main shaft is such as to alternately advance and retract the rotating cutter-shafts, as hereinbefore stated, while the timing of the operation of the chain-feed is such as to quickly advance the pieces of stock one step, equal to the diameter of one button, between the guide-plates 9 10 just after the cutter 41 has finished and cut out the button.

To prevent the scattering of the turnings or chips, each cutting-head is inclosed in a box-like chamber 53, mounted on the bed 1 and of which chambers the plates 9 10 form the inner walls, between which the stock is fed and which are provided with removable apertured tapering jaw-blocks 54, of steel, for firmly holding the stock while the cutters are performing their work. These chambers 53 are open at their lower ends and communicate with pipes 55, all of which communicate with a header-pipe 56 (see Figs. 2 and 3) and the latter communicates with the separator shown in Fig. 16. The said separator comprises a vertical pipe 57 and a horizontal pipe 58, the latter communicating with an exhaust-fan in a casing indicated at 59, a depending portion 60 being formed at the junction of the two pipes. The vertical pipe 57 communicates with a receptacle 61 for the buttons, the latter having an opening, as at 62, preferably provided with an adjustable door or damper 63.
The exhaust-fan draws air mainly through the opening 62, owing to the close fit of the cutter-head sockets 34 in the walls of the chambers 53, and hence the upward current of air carries all the cuttings and chips from the pipe 57 under the partition 60 and out through pipe 58 to any suitable place, while the buttons themselves, being heavier, fall into the receptacle 61, to be afterward removed for such purposes as the forming of the eyes or thread-holes therein.

While chips and cuttings fall through all of the pipes 55, the buttons fall only through the pipes shown at the right in Fig. 3, owing to their being cut out of the stock by the cutters 41 and pushed to the right. In each of the pipes 55 through which the buttons fall a button-catching device is placed. (See Figs. 3, 6, and 7.) Said device comprises a drawer 64, fitted to an opening in the pipe 55 and having a flange 65 fitted to slide on a bolt 66, projecting from the pipe and having a head 67 to limit the outward movement of the drawer. A spring 68 is coiled about the bolt and bears between the pipe and the flange 65 and tends to normally force the drawer outward. A finger-piece 69 may be provided, and this finger-piece or the front of the drawer is pressed against by the attendant to push the drawer inward to catch one or more buttons whenever it is desired to inspect the work that is being performed by the cutters. On releasing the drawer it is pushed outward by the spring, enabling the attendant to remove the samples desired and leaving the pipe free for the product of the cutters to pass on to the separator.

It is desirable that the pieces of stock shall be firmly clamped while being operated upon, and to this end the machine illustrated is provided with movable jaw or clamping mechanism on one side of the path of feed of the stock, while the opposing or coöperating jaw or clamp is stationary. Referring to Figs. 1, 2, and 3, it will be seen that the plate or wall 10 and its blocks 54 are fixed; but the upper parts of the plate 9 and of the chambers 53 are formed separate from the lower parts and are movable, with their blocks 54, toward and from the plate 10 to clamp the stock. Each such upper part constitutes a movable jaw or clamping member 70 and is mounted on two rods 71, adapted to slide in bearings formed in ears 72, projecting from the bearings 31 on that side of the machine. Springs 73 are coiled about the rods and are confined between pins 74, projecting from the rods and the inner side of the outer bearing 31, as shown in Fig. 1, the said springs therefore pressing the two rods and the jaw or clamping member 70 toward the opposing stationary jaw or clamping member. To relieve this pressure along the series after each simultaneous action of the several sets of cutters 41 and during the operation of the feed-chain to advance the stock one step, the several pairs of rods 71 must be slightly retracted. The mechanism illustrated for accomplishing this comprises a hub 75 on the main shaft, having a cam 76 to actuate an arm 77, which is secured to a rock-shaft 79, mounted in bearings 80, carried by the frame of the machine. The said arm 77 is provided with a roll 78, (indicated by dotted lines in Fig. 3,) which bears against said cam. The rock-shaft 79 is provided with a series of arms 81, extending upwardly and bifurcated, each of which engages the inner face of a bar or plate 82, that connects the outer ends of each pair of rods 71. (See Figs. 1, 2, and 3.) The timing of the operation of the cam 76 is such as to cause the arms 81 to retract the rods 71 and the movable clamping member 70 while the feed-chain is operating, as above described.

The arrangement of the bed 1 with a series of steps arranged in an inclined series, as shown in Fig. 8, enables horizontal ways to be formed for the sliding clamping members 70, said steps forming a shoulder or bearing for one side or edge of each of said members.

Referring to Fig. 3, an opening 83 is shown in the base-plate of the bearings 31 at the left. Said opening is for the chain and is also indicated by dotted lines in Fig. 1. As the chain passes over the base-plates of the other bearings, which are set at a lower level, no other openings are required for said chain.

In order to guide the chain in a straight horizontal path when feeding the stock, the plate 9 is provided with a horizontal groove 84 in its inner face, extending from end to end of the machine. Said groove is faced with suitable wear-resisting material, as steel, (see Figs. 3 and 9 in connection with Fig. 8,) which receives the wear of the chain. Opposite the chain guide-groove 84 the plate 10 is provided with a flat wear-receiving strip 85, as shown in Fig. 3. This strip 85 not only receives the principal wear of the sheets of material fed by the chain, but it also receives the wear of the teeth of the chain between sheets or if the teeth project through said sheets.

Referring to Fig. 9, it will be seen that the upper end of the chamber forming the movable jaw 70 is provided at its inner face with a screw-threaded opening 86. In said screw-threaded openings the apertured tapering steel blocks 54 are secured.

Fig. 8, being a face view of the plate 9, indicates the relative positions of several of the movable jaws 70, each of which is provided with a block 54.

To enable the attendant to examine the interior of the chambers 53 and the conditions of the cutters therein, the tops of said chambers are provided with removable covers. Fig. 10, being a section on the line z z in Fig. 3 looking toward the right, shows a rear elevation of two of the chambers which are at the left (in Fig. 3) of the path of movement of the stock. As shown in said Fig. 10, each chamber is provided with a hinged top or cover 87, said cover being hingedly connected with one of the slide-rods 71 and having a hooked end adapted to rest upon the other slide-rod 71 of the pair. The central portion of the hinged cover forms somewhat more than a semicircle, and it is within this arched portion that the cup-shaped end of the cutter-spindle is received. The covers of the chambers on the opposite side of the path of movement of the stop are also hinged; but as there are no slide-rods on this side of the machine the said covers are hinged at 88 to one side of the top of the chamber.

The operations of the several parts of the machine having been described in detail a general description of the operation of the machine is unnecessary.

Having now described the invention, what I claim is—

1. A machine for turning and cutting buttons from sheet-stock including in its construction means for feeding the stock in a straight horizontal line, a bed having a series of steps at different elevations, and a plurality of turning and cutting devices mounted on said steps.

2. A machine for turning and cutting buttons from sheet-stock including in its construction a plurality of rotating cutting devices, a chain having teeth for engaging the stock to feed the latter, and a guide for the chain to insure the feeding movement of the latter in a straight line, the chain-teeth projecting in a plane parallel with the axes of the cutting devices to engage sheets of stock fed between said cutting devices.

3. A machine for turning and cutting buttons from sheet-stock including in its construction cutting devices, a chain having teeth for engaging the stock to feed the latter, a guide for the chain to insure the feeding movement of the latter in a straight line, said guide being faced with wear-resisting material and a wear-strip opposite said guide to receive the wear of the teeth of the chain.

4. A machine for turning and cutting buttons from sheet-stock including in its construction a plurality of turning and cutting devices, stationary and movable inclosing chambers for said devices constituting jaws between which the stock is alternately clamped and fed, and cam mechanism for operating the movable chamber.

5. A machine for turning and cutting buttons from sheet-stock including in its construction cutting devices, a chain having teeth for engaging the stock to feed the latter, and pawl-and-ratchet mechanism for intermittently operating the chain, the chain-teeth projecting in a plane parallel with the axes of the cutting devices to engage sheets of stock fed between said cutting devices.

6. A machine for turning and cutting buttons from sheet-stock including in its construction turning and cutting devices inclosed within suitable chambers to prevent scattering of chips and buttons, pipes leading from said chambers to an exhaust, and a separator for dividing the buttons from the chips during their passage through the pipe.

7. A machine for turning and cutting buttons from sheet-stock including in its construction turning and cutting devices inclosed within suitable chambers, pipes leading from chambers to conduct the product to suitable receptacles, and a box adapted to be moved into and out of the path of the buttons as they fall from the cutters.

8. A machine for turning and cutting buttons from sheet-stock including in its construction a positive feed for the stock consisting of a toothed chain adapted to engage the stock, means for preventing the chain from moving out of a straight line while feeding and turning and cutting devices for operating on the stock while the chain is stationary, the chain-teeth projecting in a plane parallel with the axes of the cutting devices to engage sheets of stock fed between said cutting devices.

9. In a button-turning machine, the combination with the inclined bed 1 having a plurality of cutters, of the plates 9, 10 forming a passage for the stock, means for feeding the stock between said plates, the plate 10 being stationary, and the plate 9 having a movable upper portion, and means for moving the latter toward and from the stationary plate, the said plates having openings for the projection therethrough of the cutters.

10. In a button-turning machine, the combination with suitable cutting devices having a passage-way between them for the stock, of the chain 12 having spurs or teeth 13 for engaging the stock, and means for intermittently moving the chain, the chain-teeth projecting in a plane parallel with the axes of the cutting devices to engage sheets of stock fed between said cutting devices.

11. In a button-turning machine, the combination with suitable cutting devices having a passage-way between them for the stock, of the chain 12 having spurs or teeth 13 for engaging the stock, the sprockets 14 and 19 for said chain, one of said sprockets being an idler and the other having means for intermittently rotating it, the chain-teeth projecting in a plane parallel with the axes of the cutting devices to engage sheets of stock fed between said cutting devices.

12. In a button-turning machine, the combination with suitable cutting devices having a passage-way between them for the stock, of the chain 12 having spurs or teeth 13 for engaging the stock, the sprockets 14 and 19 for the chain, the sprocket 14 being secured on a shaft 15, the plate 16 having bearings for the shaft 15, the hollow screws 17 passing through the plate 16 and bearing against the frame of the machine, and the supporting-bolts 18 passing through the hollow screws 17 into the frame.

13. In a button-turning machine, the combination with plates forming a passage-way between them for sheets of stock and suitable cutting devices movable through suitable openings in said plates, of the chain 12 having spurs or teeth 13 projecting toward one of said plates for engaging the stock, the sprockets 14 and 19 for the chain, the sprocket 14 being an idler, the shaft 20 for the sprocket 19 having a ratchet 22, a pawl 24 for operating said ratchet, and means for operating said pawl 24.

14. In a button-turning machine, the combination with suitable cutting devices having a passage-way between them for the stock, of the chain 12 having spurs or teeth 13 for engaging the stock, the sprockets 14 and 19 for the chain, the sprocket 14 being an idler, the shaft 20 for the sprocket 19 having a ratchet 22, a pawl 24 for operating said ratchet, the main shaft 3 having cam 28, the reciprocating rod 26 having a roller 29 operated by said cam, the said rod 26 being connected at its other end with the arm 25 which carries the pawl.

15. In a button-turning machine, the combination with means for holding and feeding the stock, of the cutting devices each comprising a spindle having a cup-shaped socket 34 with a threaded recess at the bottom thereof, the split cutter-head 36 having an enlarged recess 37 and a threaded end 35, and the cutter 38 having a rib 39 at its inner end fitting the recess 37.

16. In a button-turning machine, the combination with means for holding and feeding the stock, of the cutting devices each comprising a spindle having a cup-shaped socket 34 with a threaded recess at the bottom thereof, the split cutter-head 36 having an enlarged recess 37 and a threaded end 35, and the cutter 38 having a rib 39 at its inner end fitting the recess 37, the outer end of the split head being enlarged, and the end of the cup-shaped socket being internally flared.

17. In a button-turning machine, the combination with the plurality of cutter-spindles 32 arranged on opposite sides of the path of movement of the stock, of the levers 45 on each side of the machine, each of said levers having a plurality of brackets each of said spindles having a reduced portion or groove 50, and each of said brackets having a finger 49 to engage said groove, and cam mechanism for alternately operating the levers.

18. In a button-turning machine, the combination with the plurality of cutter-spindles 32 arranged on opposite sides of the path of movement of the stock, of the levers 45 on each side of the machine, each of said levers having a plurality of brackets each of said spindles having a reduced portion or groove 50, and each of said brackets having a bolt 51 passing through it and adjustably secured therein by set-nuts 52, the finger 49 secured to the head of the bolt 51 and engaging the groove of the spindle, and cam mechanism for alternately operating the two levers.

19. In a button-turning machine, the combination with the spindles and the cutter-heads carried thereby, of the chambers 53 completely inclosing the cutter-heads and provided with apertured tapering guide-blocks 54 for the cutters.

20. In a button-turning machine, the combination with the spindles and the cutter-heads carried thereby, of the chambers 53 completely inclosing the cutter-heads and having screw-threaded openings in their opposing faces, and apertured blocks 54 removably secured in said threaded openings.

21. In a button-turning machine, the combination with the spindles and the cutter-heads carried thereby, of the chambers 53 completely inclosing the cutter-heads and having open lower ends, and pipes 55 communicating with said open ends for carrying away the buttons and chips.

22. In a button-turning machine, the combination with the spindles and the cutter-heads carried thereby, of the chambers 53 completely inclosing the cutter-heads and having open lower ends, pipes 55 leading from said open ends, a header-pipe connecting the pipes 55, and an exhaust connected with the said header-pipe.

23. In a button-turning machine, the combination with the spindles and the cutter-heads carried thereby, of the chambers 53 completely inclosing the cutter-heads and having open lower ends, pipes 55 leading from said open ends, a header-pipe connecting the pipes 55, an exhaust connected with said pipe, and a separator for dividing the chips from the buttons.

24. In a button-turning machine, the combination with the spindles and the cutter-heads carried thereby, of the chambers 53 inclosing the cutter-heads, the pipes 55 leading from said chambers, some of said pipes being provided with side openings, and drawers 64 fitted to be pushed inward through said openings.

25. In a button-turning machine, the combination with the spindles and the cutter-heads carried thereby, of the chambers 53 inclosing the cutter-heads, the pipes 55 leading from said chambers, some of said pipes being provided with side openings, bolts 66 projecting from the pipes, drawers fitted to slide on said bolts and to be pushed in through said openings, and springs for normally holding the drawers outward.

26. In a button-turning machine, the combination with the spindles and their cutters, of a stationary clamping member for the stock, the slide-rods 71 carrying clamping members 70, springs for each member 70 to force it toward the stationary member, the main shaft having a cam-grooved hub, and a lever operated by said cam-grooved hub and connected with all of the rods 71 to simultaneously retract them.

27. In a button-turning machine, the combination with the spindles and their cutters, of a stationary clamping member for the stock, the slide-rods 71 carrying clamping members 70, springs for each member 70 to force it toward the stationary member, the bar 82 connecting each pair of rods 71, the rock-shaft 79 having arms 81 engaging the bars 82, the arm 77 secured to the rock-shaft, and cam mechanism for actuating the rock-shaft and its arms 81 through the medium of said arm 77.

28. In a button-turning machine, the combination with the spindles and the cutter-heads carried thereby, of the chambers 53 completely inclosing the cutter-heads, and having hinged tops or covers to permit access to the interior of the chambers and to the cutter-heads, pipes leading from said chambers and means for producing a suction of air in said pipes.

In testimony whereof I affix my signature in presence of two witnesses.

GEORGE GRIFFIN.

Witnesses:
Z. SPENCER,
C. B. DAVIS.